Dec. 4, 1928.

I. L. DAWSON ET AL 1,693,595

GRAIN SHOCKER

Filed June 7, 1926

INVENTORS
Isaac L. Dawson
Clarence H. Dawson
Raymond W. Dawson
BY
William C. Edwards ATTORNEY

Dec. 4, 1928.

I. L. DAWSON ET AL 1,693,595

GRAIN SHOCKER

Filed June 7, 1926    9 Sheets-Sheet 7

INVENTORS
Isaac L. Dawson
Clarence N. Dawson
Raymond W. Dawson

BY William C. Edwards Jr.
ATTORNEY

Dec. 4, 1928.

I. L. DAWSON ET AL

1,693,595

GRAIN SHOCKER

Filed June 7, 1926

Patented Dec. 4, 1928.

1,693,595

UNITED STATES PATENT OFFICE.

ISAAC L. DAWSON, CLARENCE N. DAWSON, AND RAYMOND W. DAWSON, OF LAWRENCE, KANSAS.

GRAIN SHOCKER.

Application filed June 7, 1926. Serial No. 114,195.

The invention relates to a machine that is adapted to fit the various makes of binders and which will be operable by power obtained from the bull wheel of the binder by gear engagement with gear engagement on the binder. In our invention appears first a rigid main frame section which is anchorable to the binder and power driving means, this carries a hopper, a fork for lifting the dropped bundles out of the hopper and upon a conveyor which is carried on a trailer at the rear of the main frame section; the bundle is carried thereby to the mechanism for forming the shock, the bundles being arranged against an abutting board. At desired intervals the operator engages power mechanisms which occasion movements to the compacted suspended shock of grain bundles so as to deposit same upon the ground in the rear of the machine, thence a release is effected of the shock forming mechanism, a pivotable upper swing of the parts is occasioned ready for a continuation of the process of forming the shock. The invention includes a number of elements which in themselves are not in the same class; however each is essential to the working of the entire machine and the invention must be construed in its entirety as taking a bundle from the binder, reversing its position and depositing it and others as a completed shock in a series of movements and travels essential for such purposes. In forming operations, binders fill a wide span of use, covering small grains, as well as grasses, and sorghums and the like. Our invention will care for different lengths of bundles as will be seen by a further inspection of the device. The labor cost of shocking grains, together with the cost of twine, making binding the most expensive way of harvesting grains, is by our invention materially decreased giving the binding method an opportunity to compete on terms of equality with header or combine methods, with its own present advantages of getting into the field at an earlier date, with attendant savings in quality of grain and also to get the grain cut before hail, hot winds, etc., may damage the crop.

Referring to the drawings.

Fig. 5ᴬ is a rear view of the arm members as attached to the base of the shock-former frame member, together with the casting connecting to the lifting mechanism. This view showing the recessed seat for receiving the clevis element of the shock-former.

Figs. 19, 20, 20ˣ and 20ʸ are detail views of lever mechanisms.

Fig. 29 is a fragmentary view of the lever mechanism and slotted guide support for the foot rocking lever.

Fig. 30 is a sectional view take long the line XXX—XXX Fig. 29 looking in the direction of the arrows.

Fig. 31 is an inside perspective view of a fragmentary portion of the shock-former.

Fig. 32 is a fragmentary outside perspective view of the shock-former.

Fig. 33 is a fragmentary detail of the shock-former frame members to show the action of the spring mechanism to pull the shock-former wide open so that the latch mechanism illustrated in Fig. 34 will positively engage to hold the shock-former in the position seen in Fig. 2 and as seen in the dotted position in Fig. 4.

Similar numerals of reference indicate corresponding parts throughout all the figures of the drawings.

Figures 1, 35:
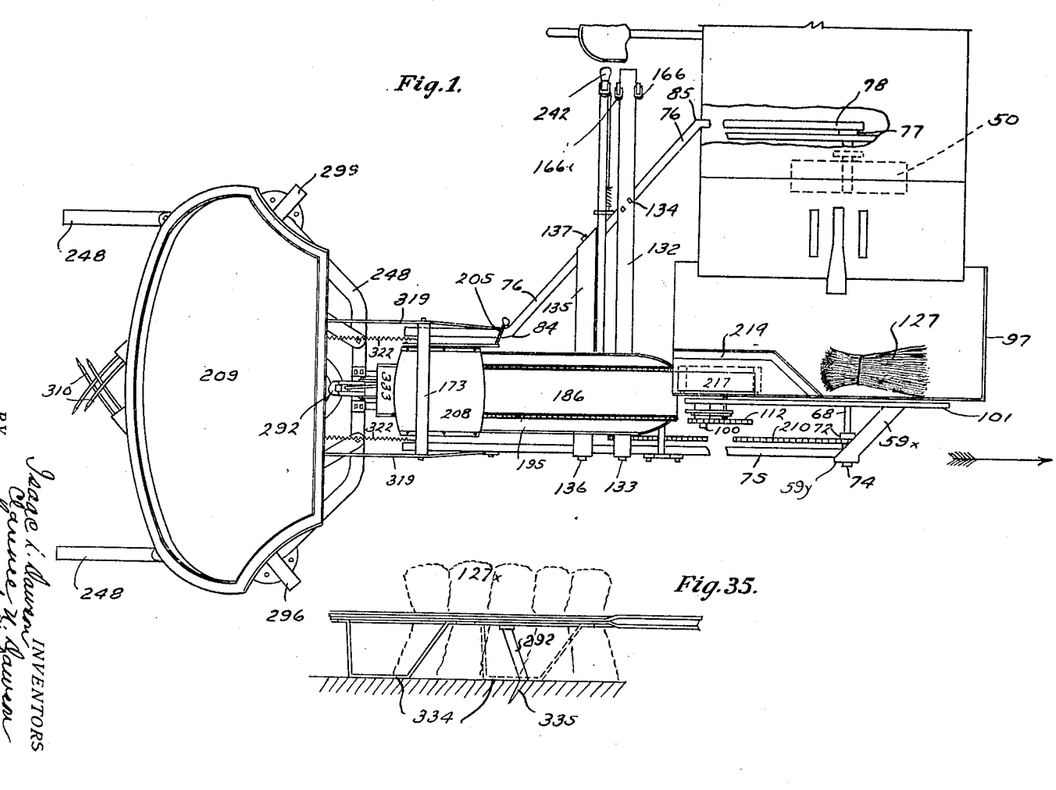
Fig. 1 is a compacted plan view showing a fragmentary portion of the deck mechanism of a grain binder and the mechanism included in our invention attached thereto, with the shock-former down and the abutting board raised. This is the position when the shock has been deposited on the ground and while still clamped and held by the shock-former.
Fig. 35 is a side view of the shock-former as seen in Fig. 1 with the spike driven into the ground, the shock is clamped by the shock-former. The dotted position of the runner indicates travel of the binder, the spike remaining stationary to open the shock forming arms prior to upward pivoting of the frame elements.
Figures 2, 36:
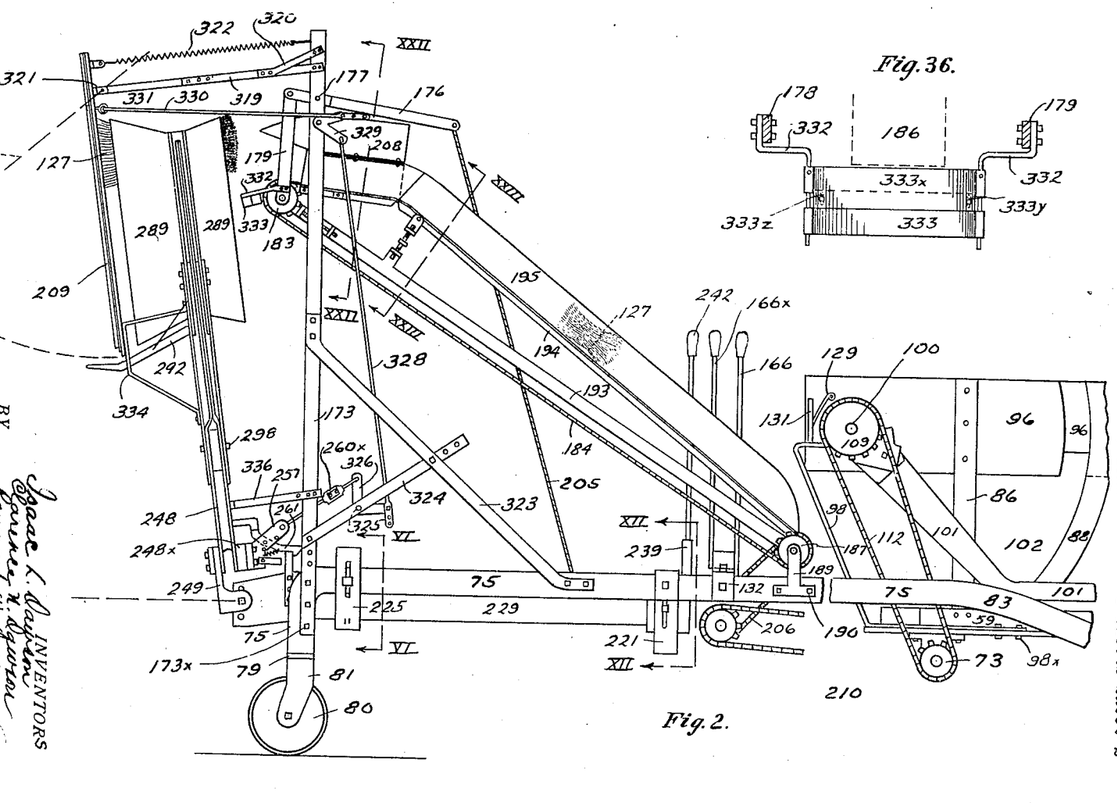
Figs. 2 and 2ᴬ represent an enlarged side view of portions of the binder and elements of our invention seen in Fig. 1; with the opened shock-former up and the abutting board in operating position with respect to the shock-former.
Fig. 36 is a top view of the supports and slats at the end of the elevator.
Figure 2A:
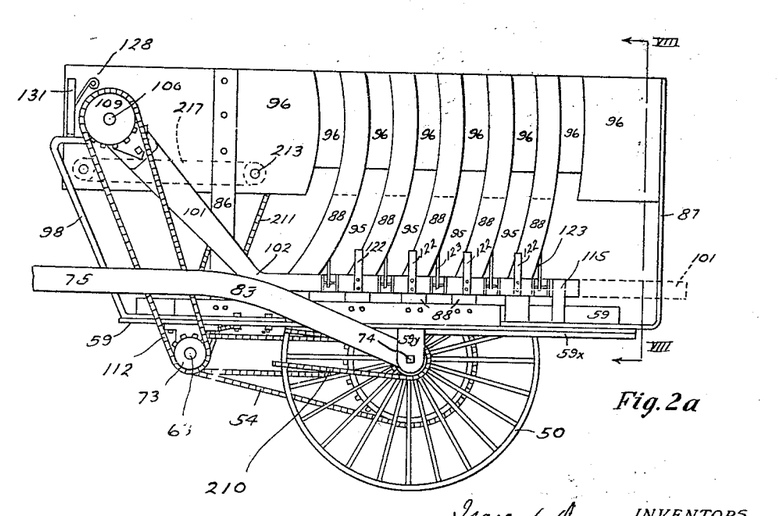
Figure 3:
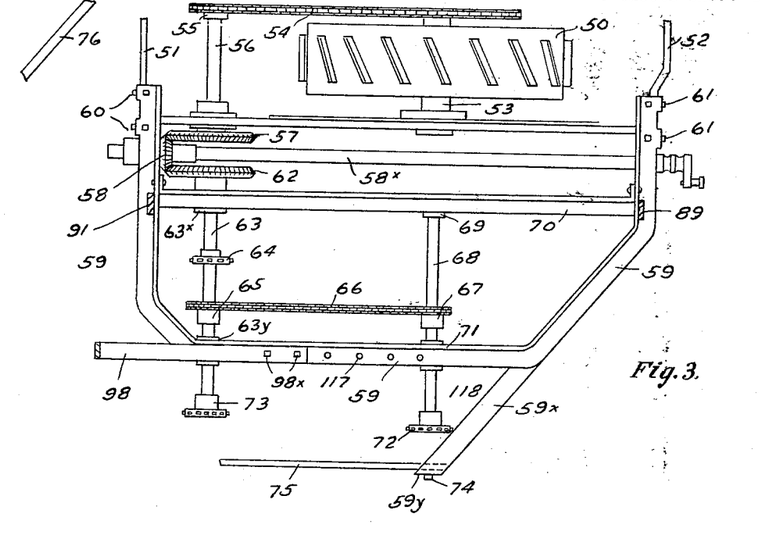
Fig. 3 is a plan view of the main frame elements and driving mechanisms of our invention as attached to the frame elements and bull wheel driving mechanisms of a grain binder.

In Figs. 1, 2ᴬ and 3 is seen the bull wheel 50 of a grain binder mounted within the binder frame members 51 and 52 on its axle 53. At 54 is seen the drive chain of the binder leading to binder sprocket 55, driving shaft 56 and bevel gear 57 and bevel gear 58 on the pitman shaft 58ˣ in the usual binder power driven assembly. Our main frame member 59 is substantially a U-shaped angle iron unit which has its outer ends rigidly secured by bolts such as 60 and 61 to the binder frame members 51 and 52. At 62 is a bevel gear on our main drive shaft 63. Shaft 63 is axially aligned with shaft 56. This gear 62 is en-mesh with the binder gear 58. This is one of the main features of our assembly making the design of our shocker adaptable to varied makes of binders since all binders have a gear disposed as gear 58 on a pitman shaft 58ˣ. Our main shaft 63 is mounted in bearings 63ˣ and 63ʸ on our frame members. Rigid with the shaft 63 will be noted the sprocket 64 for purposes later disclosed. At 65 on the shaft 63 is a sprocket 65 carrying a chain 66 driving sprocket 67 rigid with shaft 68 mounted to rotate in a bearing 69 on the cross frame brace member 70 and in a bearing 71 on the main frame 59.

In Fig. 3 a sprocket 72 is rigid with the end of shaft 68, also there is seen a sprocket 73 rigid with the end of shaft 63. It will be noted that a frame member 59$^x$ projects rigidly from the right hand side portion of the frame member 59 so that the outer depending extremity 59$^y$ terminates in the axis of the shaft 53 and the axis of shaft 68.

Figures 6, 7, 17:
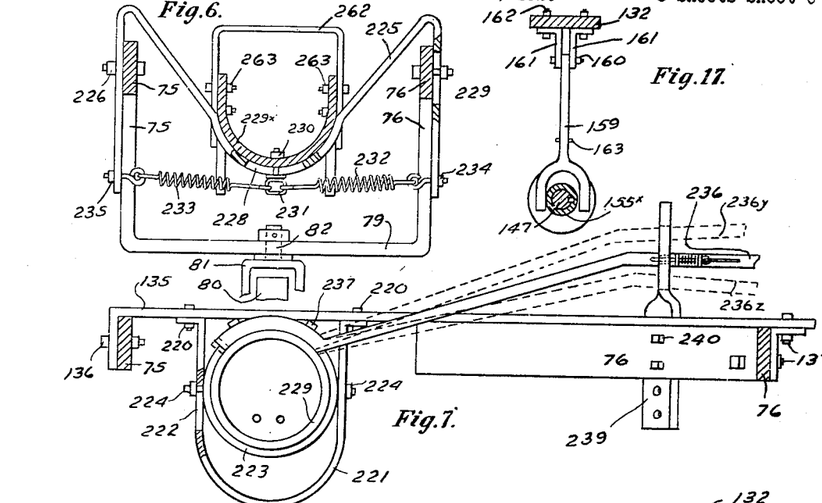
Fig. 6 is a sectional view taken along the line VI—VI, Fig. 2 looking in the direction of the arrows to show the rear bearing support of the rocking frame element and also the paired side springs for centering said rocking frame element.
Fig. 7 is a sectional view taken along the line VII—VII, Fig. 2 looking in the direction of the arrows to show the widening of the trailer frame members; the forward adjustable bearing support for the rocking frame element and the lever arm rigid with the rocking frame. The dotted positions of the lever arm show the position of said lever arm in its maximum position in either direction as the frame element is rocked back and forth for the purposes specified.
Fig. 17 is a detail of the forked shifting lever operating the clutch on the driving mechanism of the elevator.

The travel of the binder is in the direction of the arrow Fig. 1; pivotally mounted along the common axis of the shafts 53 and 68 of the assembly is a rigid frame member composed of the side element 75 hinged at 74 to the frame extension 59$^y$; the side element 76 hinged at 77 to the cross brace frame member 78 of the binder. The rear portions of the side members 75 and 76 are depressed, as seen in Figs. 2 and 6, to a lower level being connected by the transverse portion 79. The said frame elements 75—79—76 constitute a trailer hinged as previously stated at 74 and 77. Said trailer is supported and carried at the rear by a caster wheel 80 mounted on the part 81 pivoted at 82 to the part 79.

In Figs. 2 and 2$^A$ it will be noted that the element 75 is normally in a horizontal position which necessitates a slight bend at 83 to reach to the pivot point 74. Likewise as seen in Figs. 1, 6 and 7 bends are made in the element 76 at 84 and 85 this element to properly assist the element 75 in carrying the various parts of our device and to reach to its pivot 77. Nearly all binders have a tendency to a side draft; by means of the location and character of our device, a compensation is effected which eliminates entirely this objectionable feature.

In our invention, the bundle carrier commonly used in grain binders is eliminated. In lieu thereof we employ; first, a bundle receiving hopper 96 situated beyond and below the discharge arms of the binder bundle tying mechanism. Into this hopper 96 a tied bundle 127 of grain straws is dropped by said discharge arms; with the butt of the bundle arranged towards the front of the binder or as seen in Fig. 1. It will here be explained that we provide a means to lift, toss and throw this bundle 127 rearwardly upon an elevating mechanism so that the butt of the bundle is arranged to face rearwardly as in Fig. 2; thence the bundle travels towards a shock-former, later described, which receives, squares and shapes the butts of the bundles against an abutting board, then compacts and deposits the several bundles upon the ground as a completed shock, in a sequence of movements, travels and releasing operations as will be later explained.

At 86 is a vertical supporting member carried from the frame 59 at the outer rear corner thereof as seen in Fig. 2$^A$. Similarly a forward supporting member 87 projects from and beyond the outer front corner of the frame 59. A plurality of intermediate supporting members 88, arranged in a series at a properly spaced distance apart are likewise mounted from the outer side of frame 59.

Figures 8, 9, 10, 11, 12, 25, 26:
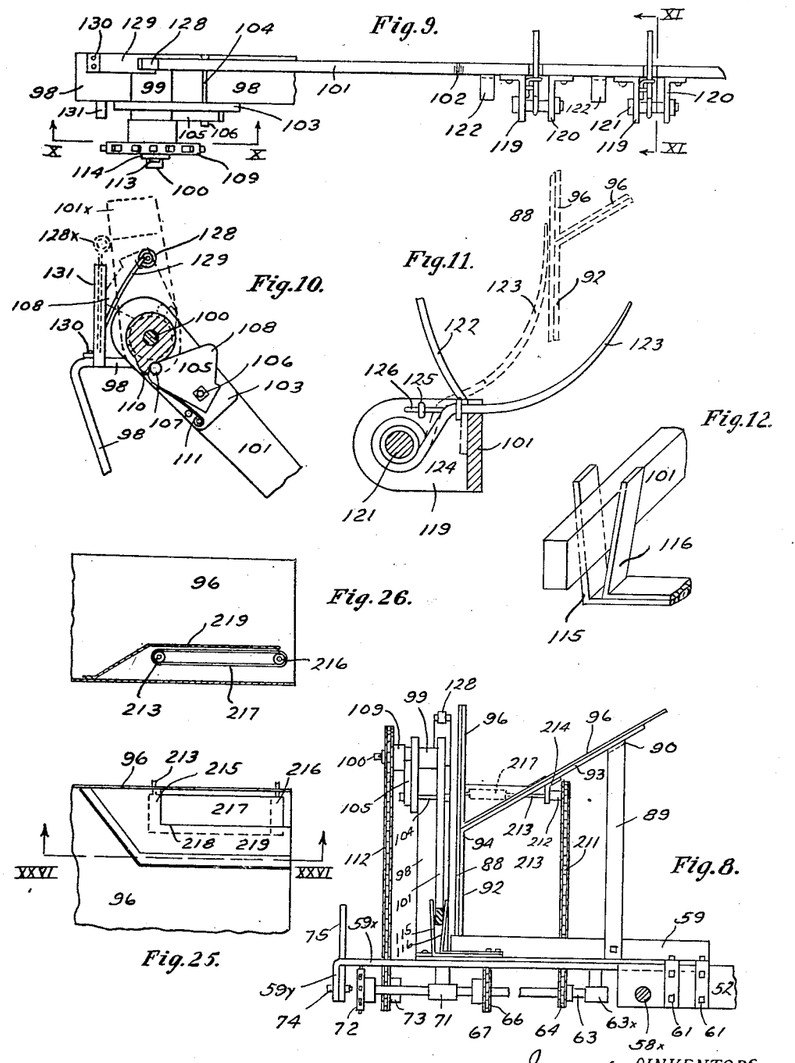
Fig. 8 is a sectional view taken along the line VIII—VIII Fig. 2ᴬ, looking in the direction of the arrows, to show the bundle receiving hopper with allied mechanisms for operating the bundle fork and the loose straw conveyor.
Fig. 9 is a top view of the composite bundle fork elements seen in Fig. 2ᴬ.
Fig. 10 is a sectional view taken along the line X—X Fig. 9 looking in the direction of the arrows to illustrate the power driven dog and allied stops, spring and operative elements affecting the functional operation of the bundle fork.
Fig. 11 is a sectional view taken along the line XI—XI Fig. 9 to show the stationary fork and the pivotable fork of a single fork assembly as attached to the composite bundle fork arm mechanism.
Fig. 12 is a perspective view showing a seat and spring stop mechanism for receiving the returning fork arm member.
Fig. 25 is a plan view at the rear of the hopper to show the loose straw conveyor.
Fig. 26 is a sectional view taken along the line XXVI—XXVI Fig. 25.

At 89 Fig. 8 is seen a vertical supporting member mounted on the frame 59. It will be noted that this member 89 is bent at 90 as a horizontal supporting member which is bent downwardly at the opposite end as a supporting standard 91, as seen in Fig. 3.

At 92 Fig. 8 is a vertical supporting member 92 rigid to a member 88, the upper portion 93 of member 92 is bent at 94 so as to rest upon the horizontal support 90. There is a member 92 for each member 88, or so as to leave the spaces 95 therebetween as in Fig. 2$^A$.

The bundle receiving hopper 96 is as seen in the sectional view Fig. 8 preferably of V-shaped configuration having its outer vertical face rigidly affixed to the members 86, 87, 88 with the sloping base attached to the supports 90 and 93. The hopper 96 is open towards the rear but is closed at the forward end at 97 as seen in Fig. 1.

At 98 at the rear outer corner of the frame 59 is seen an upright support secured by bolts 98$^x$. The support 98 terminates in a bearing 99 housing a horizontal shaft 100. Rigid to the rear of the shaft 100 is an arm member 101 bent at 102, as seen in Figs. 2 and 2$^A$, at an obtuse angle. Rigid to the shaft 100 on the opposite side of the bearing 99 is an arm supporting member 103. A member 104 is rigid to both the arm 101 and the member 103. At 105 is a plate pivoted at 106 to the member 103. This plate 105 carries a roller 107 at the end opposite the point of pivot and is offset as at 108 Fig. 10 for purposes later defined. A sprocket 109 loose on the shaft 100 has a catch 110 projecting from the hub thereof which catch 110 in Fig. 10 is just engaging the roller 107 of the pivoted plate 105. The spring 111 attached to arm 103 tends to make the plate 105 contact the hub of sprocket 109 to hold the catch 110 against said roller 107. The sprocket 109 is continuously driven by chain 112 leading from driving sprocket 73 and is held on the shaft 100 by cotter pin 113 and washer 114.

In Figs. 2$^A$ and 12 the arm 101 is seen dropped into a seat formed by the elements 115 and 116 attached to the frame 59. The upright portions of these members form a wedge adapted to locate the arm 101 in its proper position at the bottom of its pivoted movement.

For extra long grains such as cane, kaffir and the like, we may employ several forked units such as seen in Fig. 11 or as seen in Fig. 2$^A$, where there is one for each space 95. It will be noted that the shape of the members 88 and 92 is such as to cause the spaces 95 to form an arc adapted to pass the sweeping forked units on the arm 101 Figs. 9 and 11. For shorter grains, the bolts 98$^x$ Fig. 3 can be shifted to engage the member 98 with other holes such as 117 or 118; this would move the shaft 100 forward or so that the arm 101 would be shifted forward to the dotted position Fig. 2$^A$, in this event certain outer forked units such as that disclosed in Fig. 11, would be omitted from the arm 101. Less power is required therefore to operate the arm 101 for shorter grains than for the longer grains.

Referring to Figs. 9 and 11; a pair of angles 119, 120 are bolted to the arm 101. A bolt 121 engages between these angles. A fork 122 is rigid to the face of the arm 101. A second fork 123 is pivotally mounted on the bolt 121. A spring 124 hooks over the fork 123 passing through the keeper 125 with its outer end penetrating and secured within the angle 119. Thus in the position of the arm 101 illustrated in Fig. 2$^A$ the fork 122 would be arranged on the outside of the face of the member 88, while the fork 123 would be positioned within a space 95 beneath a bundle 127 dropped within the hopper 96.

Referring to Fig. 10; the arm 101 is dropped, as in Fig. 2$^A$, so that the forked members 122 and 123 stand as in Fig. 11. The catch 110 has engaged the roller 107 so that the chain 112 driving the sprocket 109 causes the catch 110 to raise the member 103 and thereby raise the arm 101. This movement is properly timed so that the fork 123 engages under a bundle 127, Fig. 1 to lift, toss and deliver said bundle in a reversed position upon the elevator as outlined in Fig. 2 and as later discussed. The travel of the arm 101 meets with a spring resistance when the arc movement causes the edge of the member 101 to contact the roller 128 mounted on a bearing at the extremity of the spring 129 attached at 130 to the support 98. The offset portion 108 of the member 105 in the dotted position seen in Fig. 10 is shown striking against the upright post 131 rigid to the support 98; this causes the plate 105 to pivot on the bearing 106 to release the roller 107 from engagement with the catch 110. Immediately the spring 128 driven to the dotted position 128$^x$ causes the member 101 now standing in the dotted position 101$^x$, to quickly fall back to the lower position seen in Figs. 2 and 2$^A$. During this movement possibly a bundle has been dropped into the hopper 96 from the binder discharge arms. In this case the several forks would each pivot on their respective bolts 121 upon striking such bundle so as to assume the dotted position 123$^x$, Fig. 11 during the descent, or so as to pass the bundle, when spring 124 would cause them to take their proper position 123, Fig. 11.

The spring action 129 causes the members 101 to drop to the position seen in Figs. 2 and 2$^A$ prior to the time that the catch 110 in its revolution meets the spring actuated roller 107, so that, as soon as the catch 110, Fig. 10 again meets said roller, the allied elements of the forked arm member 101 are ready to again function to toss bundles 127.

Figures 13, 21, 22, 23, 24:
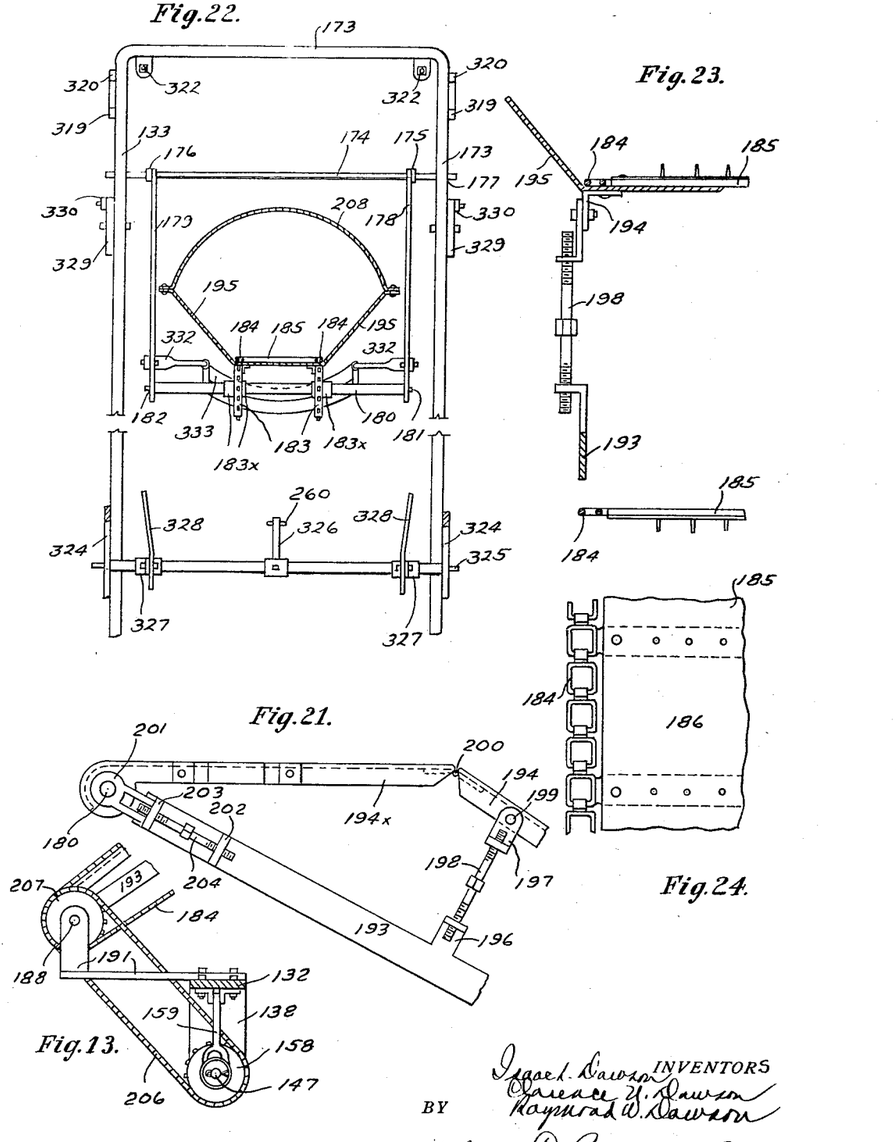
Fig. 13 is a fragmentary detail of supporting frame and driving mechanisms at the base of the elevator device.
Fig. 21 is a fragmentary side view of the upper frame of the elevator.
Fig. 22 is a cross-sectional view taken along the line XXII—XXII Fig. 2 looking in the direction of the arrows; the lower attached portion of the figure referring to other features of our invention supported on the framework disclosed at a lower level.
Fig. 23 is a cross-sectional view taken along the line XXIII—XXIII Fig. 2.
Fig. 24 is a fragmentary view of the belt conveyor.
Figures 14, 18:
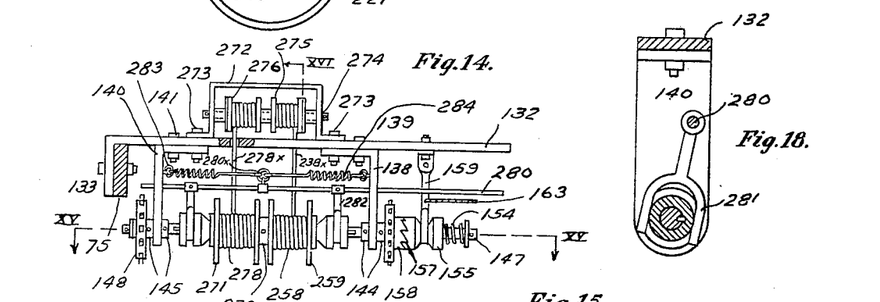
Fig. 14 is an illustration of the compression drum, the raising drum, the spring actuated winding drum and the clutch and driving mechanism for the elevator.
Fig. 18 is a detail of one of the forked shifting levers as used to engage a clutch mechanism with the drum mechanism.

Referring to Figs. 1, 2, 5, 7, 13 and 14; at 132 is seen a cross frame member bolted at 133 to the member 75 and at 134 to the member 76. At 135 is seen a cross frame member bolted at 136 to member 75 and at 137 to member 76. In Figs. 13 and 14, a hanger 138 is bolted at 139 to the member 132 also another hanger 140 is bolted at 141 to member 132. These hangers 138 and 140 are each provided with a bearing 142, 143. Collars 144 for the bearing 142 and 145 for bearing 143 are provided with set screws such as 146 to locate and position the driving shaft 147 housed in said bearings.

Figures 15, 16:
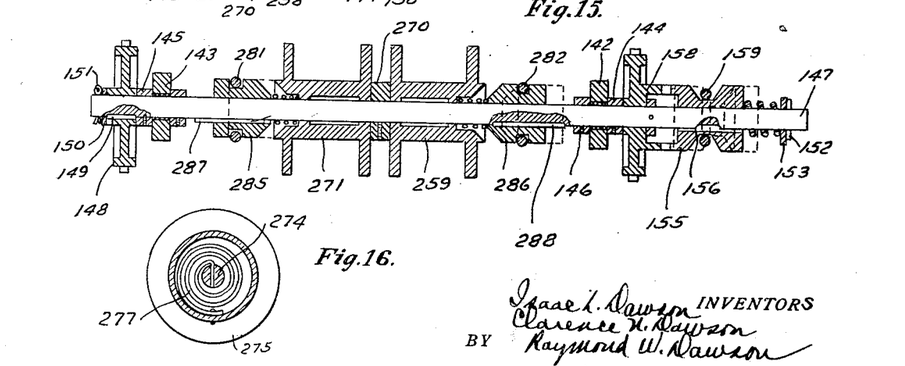
Fig. 15 is a sectional view taken along the line XV—XV Fig. 14.
Fig. 16 is a sectional view taken along the line XVI—XVI through a winding drum looking with the arrow, to show the spring mechanism for revolving a drum to take up the slack in a cable.

In Fig. 16, at 148 is a sprocket keyed at 149 to the shaft 147. At 150 is a washer and at 151 a cotter pin to hold said sprocket in place on said shaft adjacent the collar 145.

At 152 is a cotter pin through the end of shaft 147. A washer 153 abuts the cotter pin. A spring 154 around shaft 147 abuts the washer 153. A clutch member 155 is slidable upon a key 156 rigid with the shaft 147. Said clutch 155 has a clutch face 157 adaptable to engage with or disengage from a clutch face on the hub 158 of a sprocket loose on the shaft 147 adjacent the outer collar 144. In Fig. 17 is seen the forked member 159 hinged at 160 to angles 161 bolted as at 162 to the frame member 132. The forked member 159 engages the grooved central portion 155$^x$ of the clutch member 155. The cable 163 attached to the forked member 159 leads around a roller 164 on the shaft 165, Figs. 19, 20 and 20$^Y$ on which is mounted the lever 166. The shaft 165 is integral with the main element 167 which is bolted to the member 132. At 168 is a hand latch for the lever 166 to which the cable 163 is attached. A rod 169 hooked to the handle 168 operates a dog 171 spring controlled at 170 for desired positions upon the notched segment 172 as will be readily understood.

At the rear of Fig. 2 is seen an upright inverted U-shaped frame member 173, the legs being bolted as at 173$^x$ to the rear depending portions of the member 75—79—76. A horizontal shaft 174 is housed in the side members 173. A pair of levers 175, 176 pivot as at 177 on the shaft 174. Depending from these levers are the hangers 178 and 179. A shaft 180 engages at 181 and 182 between these hangers. Sprocket wheels 183 Fig. 22 are loose on the shaft 180 and spaced by collars such as 183$^x$ rigid to the shaft.

An endless conveyor belt comprising side chain members 184 connected by transverse spiked bars 185 and covered by canvas belting 186 has its chains 184 carried by the sprockets 183. This belt leads around the lower sprocket wheels 187 rigid with shaft 188 rotating in the housing supporting post 189 bolted to frame 75 at 190 and the housing supporting member 191 bolted at 192 to the member 132.

The frame of the elevator comprises the lower sill members 193 and the upper frame members 194. A flaring steel trough 195 is bolted to the angles 194.

Lugs 196 rigid with the sills 193, on either side, are connected by adjustable threaded bolt mechanisms 198 to lugs 197 pivoted as at 199 to angles 194. The extreme outer end portion of the frame members 194 comprise separate frame portions $194^x$ hinged to members 194 as at 200. At 201 is a bearing for shaft 180. At 202 is seen a lug on a member 193. The bearing 201 has a part 203 adjustably movable from or towards the lug 202 by means of adjusting bolt mechanism 204; this adjustment together with the one at 198 changes the relative hinged position at 200 of the frame portions $194$—$194^x$.

Figures 13, 20, 20X, 20Y, 29, 30, 31, 32, 33:
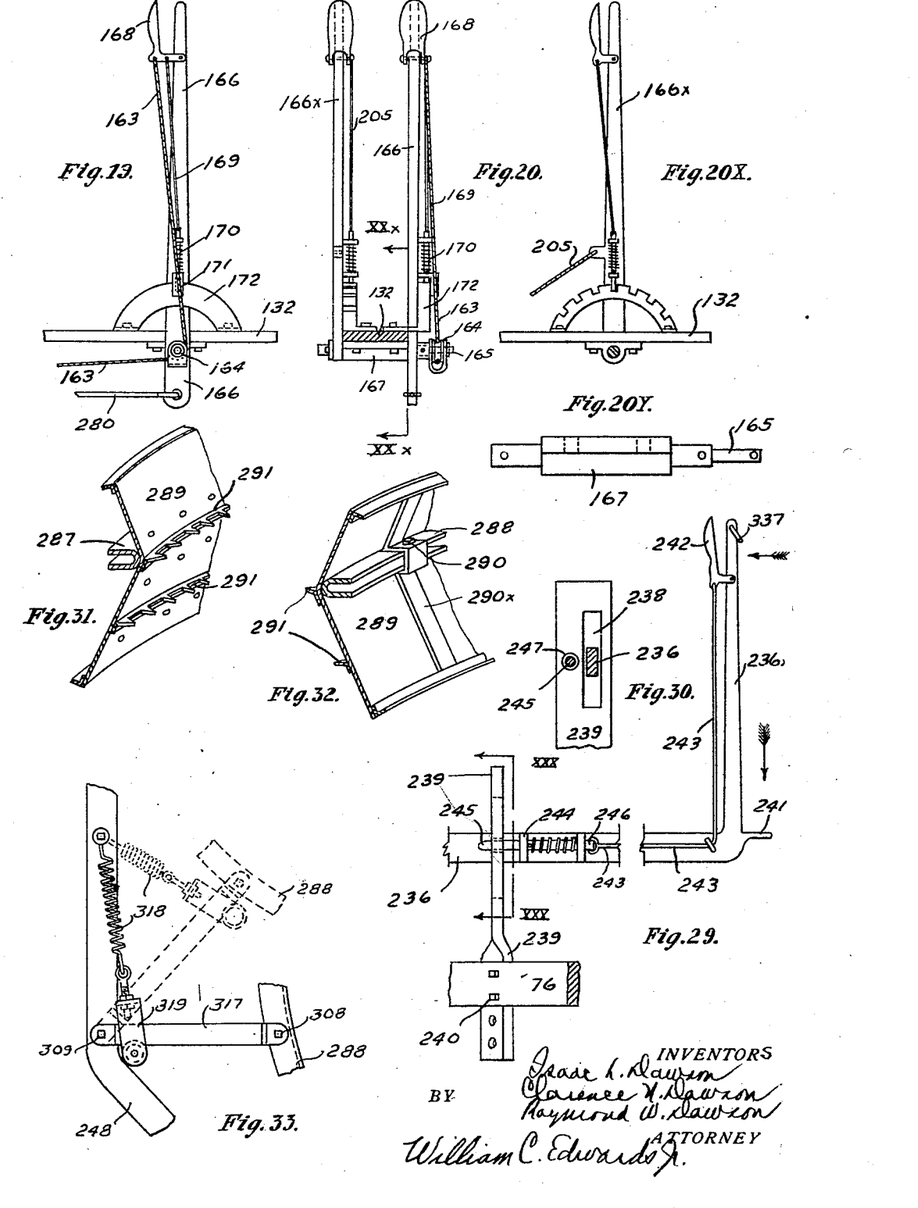

A cable 205 attached to the lever 176, Fig. 2 leads to the lever $166^x$, Figs. 20 and $20^x$ and raises or lowers the axle supporting hanger 179. This is useful in directing the outgoing bundle towards the abutting board at a desired level. A drive chain 210 leads from sprocket 72 to sprocket 148 so that when the sprocket 158 is engaged by the clutch 157, the chain 206 Fig. 13 drives the sprocket 207 rigid with the shaft 188 driving sprockets 187 to drive the chain conveyor 184. The spiked slats 185 Fig. 2 are carrying the bundle of grain 127, with its butt towards the rear, towards the upper rear end of the elevator. A cover shield 208 rigid to the trough 195 at the end of the elevator, assists the adjusted hinged position of the portion $194^x$ in assuring that the bundle of grain will be properly arranged when it is finally driven off the belt 186 so that it will strike the abutting board 209 butt first, and in a horizontal position; the intent being that this thrust will square up the bundles against the abutting board within the shock-former as later explained.

In Figs. 1, $2^A$, 8, 25 and 26; the sprocket 64 drives the chain 211 rigid on shaft 213. The shaft 213 is rotatable in bearings 214 and 215 carried by the frame supporting the hopper 96. At 216 is a second shaft also mounted to rotate in bearings on said frame. This shaft is arranged rearwardly from the shaft 213. These shafts are each enlarged as rollers carrying an endless belt 217. A shield 219 for the hopper 96 is cut away at 218 to enable loose straw to fall upon the moving endless belt 217. This belt is arranged so that this straw will be dumped upon the conveyor belt 186 and carried up the elevator to the shock-former mechanism.

In Figs. 1, 2, 5, 6, 7, 27 and 28; suspended by bolt members 220 from the transverse frame member 135 is a U-shaped hanger 221 slotted on opposite sides as at 222. A cylindrical member 223 is slidable up and down within the U-shaped hanger 221 for adjustment purposes, the stud bolts 224 projecting from opposite sides of the member 223 furnishing clamping means for the adjusted assembly. At 225 is a rear M-shaped hanger attached at 226 and 227 to the members 75 and 76. The base of the hanger 225 is formed in the arc of a circle as a bearing and has a slot 228. A member 229, formed as a cylinder at the forward end, is adapted to rock in the bearings 223, 225; the central portion of the member 229 is U-shaped at $229^x$, Fig. 6. The bolt 230 passes the slot 228. Its head 231 is engaged between two oppositely disposed springs 232 and 233, respectively anchored at 234 and 235 to the members 75 and 76, normally holding the member 229 in the position seen in Figs. 5 and 6. In Fig. 7 is seen a rocker arm 236 rigidly bolted at 237 to the member 229. The dotted positions $236^y$ and $236^z$ show the maximum opposite rocking limits of the lever 236 as limited by bolt 231 in slot 228 and slot 238 in the standard 239 adjustably bolted as at 240 to the member 76. The lever 236 has a foot rest 241 accessible to the driver of the binder. A hand grip 242 on upright portion $236^x$ of the lever 236 connects to the cable 243. Bosses 244 pass the pin 245, Figs. 29 and 30, connected at 246 to the cable 243. The pin 245 is shown engaged within the hole 247 in the standard 239 to hold the member 229 in its central position, Figs. 6 and 7. Releasing pin 245 and pushing lever $236^x$ in the direction of the arrow Fig. 29 rocks the arm 236 to the dotted position $236^y$. Stepping on rest 241 as indicated by the arrow rocks the arm 236 to the lower level $236^z$ and thus rocks the frame of the shock-former as illustrated in the lower dotted positions $248^x$ and $248^y$, Fig. 4.

Referring to Figs. 1, 2, 4, 5, 27, 28, 31, 32, 33 and 34; the U-shaped frame member 248 is preferably U-shaped also in cross-section. At the base of frame 248 are a pair of arm members bolted thereto as at 250. These arms 249 pivot on the bolt 251 horizontally mounted through the extended side elements $229^y$ at the rear end of member 229. At 252 is a cross plate supporting the bolted members 250 and forming with the offset portion $248^x$ of the frame, a pocket 255, Fig. $5^A$.

Figure 27:
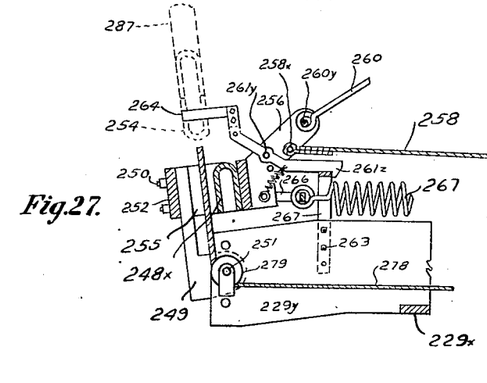
Fig. 27 is a sectional view taken along the line XXVII—XXVII Fig. 5ᴬ looking in the direction of the arrows to show latch and spring mechanisms of the frame elements and the pocket for the clevis.
Figure 28:
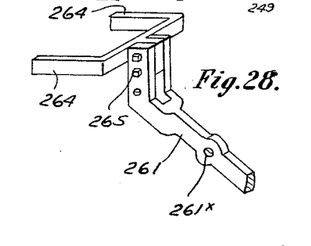
Fig. 28 is a perspective view of the trip latch seen in Figs. 2 and 27.

The pivoting action of the main frame 248 will be first described; it being understood that the shock former mechanisms therein attached will perform their relative later described functions in the pivoted positions of said outer frame 248 and also under its rocking movements when occasioned. A casting 253, Fig. $5^A$ fits the base $248^x$ to which it is also bolted by the bolts 250. On the casting 253 are a pair of upright arms 256 and 257. Attached at the pin $258^x$ spanning between the arms 256 and 257, Fig. 27 is seen the lifting cable 258 leading to a drum 259 on shaft 147, Fig. 14. A rod 260 with turnbuckle adjustment, 260ˣ, Figs. 2 and 27, connects to bolt 260ʸ spanning between the arms 256, 257. In Figs. 27 and 28 is a catch lever 261 having a pivot opening 261ˣ receiving the bolt 261ʸ on the arms 256, 257. The hooked end 261ᶻ is adapted to engage or disengage the inverted U-shaped member 262 bolted as at 263 to the sides of the members 229ʸ. A forked member 264 is bolted at 265 to the opposite end of lever 261, adjustment holes being provided as seen in Fig. 28. A clevis 266 bolted at 267 to arms 256 and 257 connects to tension spring 267 provided with turnbuckle adjustment 268 and attached to member 229 at 269.

In Figs. 14 and 15 is seen a collar 270 bolted to shaft 147 spacing the drum 259 from the drum 271. A U-shaped frame element 272 is bolted at 273 above the member 132, the winding drum draft 274 is statonary in the side members of the frame element 272. A pair of winding drums 275 and 276 are loose on shaft 274. Each is provided with coiled spring mechanism; for instance, in Fig. 16 a spring 277 is attached to shaft 274 and drum 275. This spring tends to keep the cable 258 taut in this manner. A second cable 258ˣ is wound on drums 259 and 275 so that as drum 259 winds up cable 258, the cable 258ˣ is unwound, against spring resistance from drum 275 and vice versa. At 278 is a compression cable leading around roller 279 on shaft 251 to connect through the base of clevis 254 to the latch 279 on the shock former Fig. 34. This cable is wound up on drum 271. The drum 276 provided with spring means similar to that disclosed in Fig. 16 keeps this cable 258 taut, since a second cable 278ˣ is also wound on drums 271 and 276 for this purpose.

In Figs. 14 and 19, a rod 280 connects to lever 166. The rod 280 in Fig. 18 is shown provided with the forked clutch shifting lever 281. The lever 282 on the shaft 280 Fig. 14 is similar to the lever 281. The levers 281 and 282 are bolted to shaft 280. A pair of tension springs 283, 284 attached to supports 140 and 138 and rod 280 at 280ˣ, normally hold the clutches 285 and 286 slidably mounted on keys 287 and 288 on the shaft 147 in the neutral position seen in Fig. 14. When the lever 166 is shifted to the left, Fig. 19, the clutch 285 would engage drum 271 shifting clutch 286 to the right or dotted position Fig. 15. A similar movement of the lever 166 to the right would engage the clutch 286 to drum 259.

Figure 4:
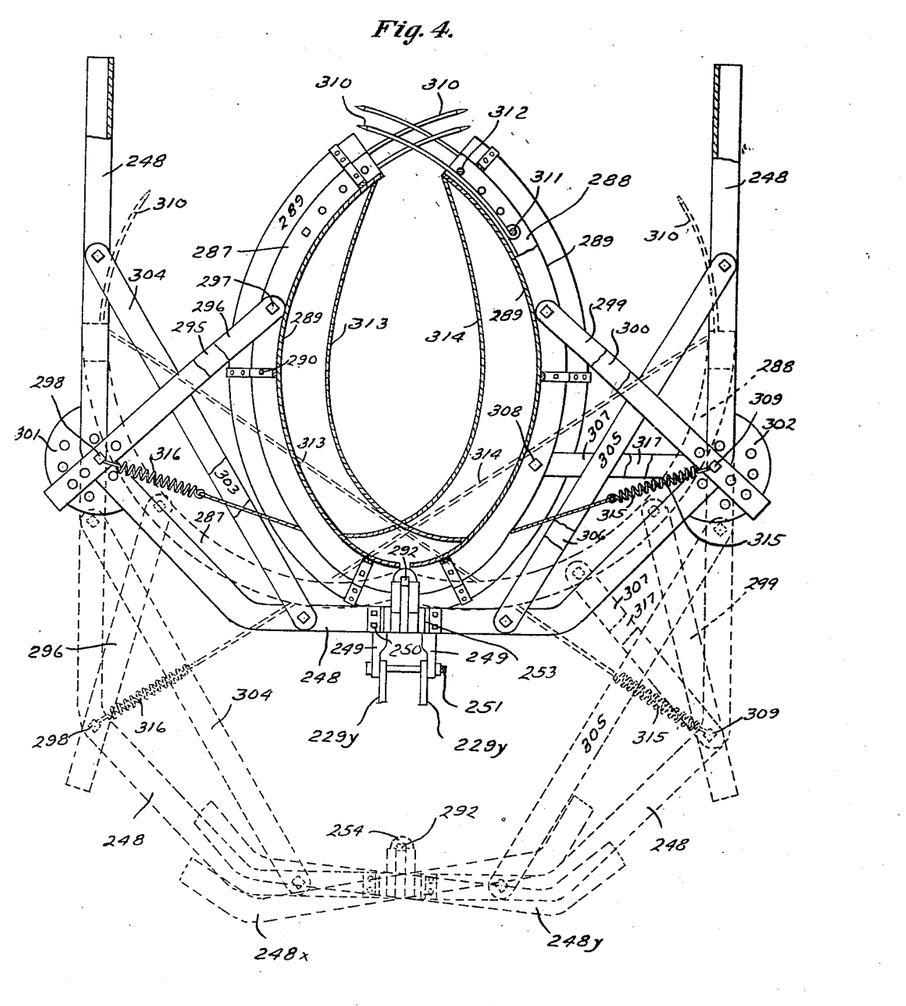
Fig. 4 is an enlarged detail view of our shock forming mechanism showing, in solid line view, the closed or maximum clamped forming position as illustrated in Figs. 1 and 35; the dotted line position showing the maximum released position of the allied parts of the shock-former after release from the shock and again as seen in Fig. 2 ready to receive grain bundles for shock forming purposes.
Figure 5:
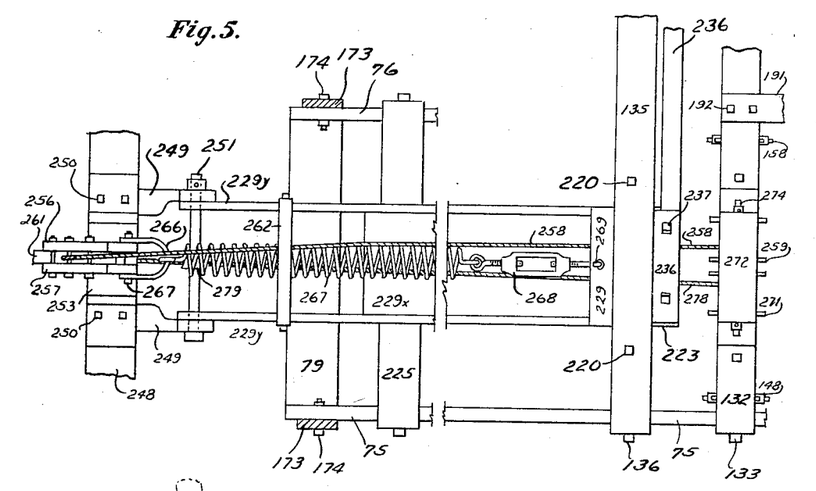
Fig. 5 is a horizontal and detail plan view of the horizontal rocking frame element to which the shock-former frame is pivoted as in Fig. 4; the figure illustrating the allied bearing supports for the rocking frame element carried by the trailer frame elements together with the counter-balance spring, rocker arm, the compressing cable, the lifting cable for assisting the counter-balance spring and the winding drums for said cables. The shock-former frame being down as in Figs. 1 and 4.
Figure 5A:
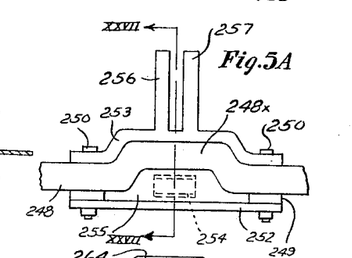

In Figs. 1, 2, 4, 31, 32, 33, and 34 will be seen the shock-former; the side members 287 and 288 are of U-shaped cross-section and curved as seen in Fig. 4. Each is covered on its inner side with a sheet iron former 289 bolted thereto as at 290 and having spiked rib members 291 thereon. Plates 290ˣ assist bolts 290 in supporting the members 289. The members 287 and 288 pivot on the ground spike 292 to which the clevis 254 attaches. The spring controlled latch 279, Fig. 34 hinges to member 287 at 293 with its catch 295 engaging the keeper 294 on member 288 to hold the members 287 and 288 wide open as in the dotted position Fig. 4 or as seen in Fig. 2 ready to receive the bundle of grain 127. A pair of braces 295, 296 hinge at 297 and 298 between the members 248 and 287. Similarly attached between the members 248 and 288 are the pivoted braces 299 and 300. Adjustments are seen in the ends of these braces which may be bolted to any of the holes seen in plates 301, 302 as will be readily understood. Braces 303 and 304, 305 and 306 rigidly brace the member 248. A brace 307 hinged at 308 and 309 serves to keep the members 287 and 288 centrally arranged at all pivoted positions. Forked rods for members 287 and 288 such as 310 have their ends looped and bolted at 311 with a pin 312 supporting such rod in proper position. At 313 and 314 are shown ropes. The retaining rope 313 connects to the outer end of member 287 and to the tension spring 315 attached to the post 309. Rope 314 connects the end of member 288 to the spring 316 attached to the post 298. In Figs. 3 and 4 is seen the brace 317 pivoted at 308 and 309 between the members 248 and 288. A spring 318 is attached to a clevis 319 carrying a roller mounted in the clevis to roll and slide along the underside of bar 317. The tension on the spring 318 tends to draw the bar and member 288 to the dotted position seen to make sure the catch 295 will engage the keeper, Fig. 34.

Referring to Figs. 1, 2, 22, and 27. Brace members such as 319, 320 carried by the standard 173 project rearwardly. The abutting board 209 is an enlarged plate surface of varying configuration as seen in Fig. 1. This board 209 is hinged to the braces at 321. Springs 322 connect the standard 173 to the upper end of the board 209. At 323 are braces for the standard 173 bolting to frame members 75 and 76. A pair of braces 324 adjustably span between standard 173 and braces 323. A shaft 325 is mounted to rock on bearings in the members 324. Centrally attached to the shaft 325 is the lever 326 to which the looped end of rod 260 engages. A pair of outer levers 327 rigid with the shaft 325 attach to rods 328. Pivoted on the standard 173 are seen the bell cranks 329 from which lead the rods 330 to pivoted connections 331 on the abutting board.

The binder traveling and cutting grain, the bundle 127 Fig. 1 has been lifted by fork 101, tossed in reversed position rearwardly upon the carrier 186 which has carried the bundle rearwardly as in Fig. 2 so that the butt of the bundle contacts against the abutting board 209. A pair of supports 332 Figs. 2 and 36 attached to hangers 178, 179 are connected by slats 333, 333ˣ which insures that bundles and loose straw leaving the conveyor will continue onto the shock-former. The slats are arranged to telescope, a slot 333ʸ in slats 333ˣ passing a clamping bolt 333ᶻ in slat 33 so that the effectual width of this assembly may be widened or narrowed as desired. The horizontal bundle 127 at the abutting board Fig. 2 tends to fall downwardly, being stopped at the point of intersection of the ropes 313 and 314, as shown in the dotted position Fig. 4. Thus the bundles may roll until they come to rest in a proper retained position within the members 289. The function of the rocking arm 236 is to enable the operator to pivot the base member 229 so as to rock the frame 248 to the right or left as seen at 248ˣ, 248ʸ Fig. 4, thus assisting the ropes 313 and 314 in filling the shock-former to its desired capacity and in a relative proper shaping prior to compacting.

Figure 34:
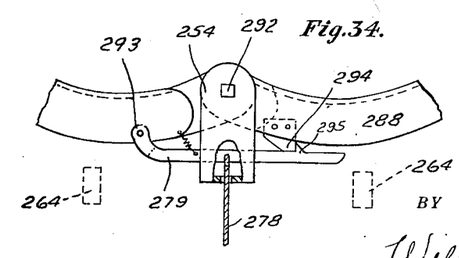
Fig. 34 illustrates also the position of the open former arms on their downward travel to strike the forked lever Fig. 28.

At this point the operator pushes on lever 166 engaging clutch 285 to drum 271 to wind up cable 278 Figs. 27 and 34. This breaks the latch connection at 295 and causes the members 287 and 288 to pack the contained bundles into the space indicated in the closed former position at the top of Fig 4. Gravity and compressing cable 278 act then together to drop the members 287 288 downward, during the descent the forks strike the members 287 and 288, the forks 264 thereby pivoting the lever to release the latch 261ᶻ. The clevis 254 is drawn within the pocket 255, the operator has moved the lever 166 to neutral but is holding the hand latch 168 closed so as to keep the clutch 157 disengaged to keep the elevator from traveling.

As seen in Fig. 2 the shock-former is off center and the release of the catch 261ᶻ permits the members 249 to pivot and the runners 334 attached to the underside of the member 248 now strike the ground. The spike 292 is driven into the ground at 335, the pocket 255 insuring stiffness of the assembly for this purpose. The release of the catch 261ᶻ has performed a further office; namely, the rod 260 has been forced by the pivoting of the members 249 to pull on the lever and rod assembly 326—328—329—331 to exert a thrust at 331 to pivot the abutting board upwardly through the dotted arc Fig. 2 to the position 209ˣ and as illustrated in Fig. 1.

The binder continues its travel so that the spike 292 standing stationary in the ground at 335 Fig. 35 causes the members 287—288 to open as the frame 248 moves ahead at the speed of the binder or to the dotted position of the parts as outlined in Fig. 4. This releases the shock of grain 127ˣ from the forming side members 289 in a perfect, compact, well settled shocked position. As these members 287 and 288 are opening up, the springs 315 and 316 are holding a spring tension on the cords 313 and 314 which permits the final setting of the shock under ideal conditions as the more powerful clamping members 287 and 288 are released.

As soon as the shock is released, the operator moves the lever 166 to the right Fig. 19 to engage clutch 286 to drum 259 to wind up the lifting cable 258 which pivots the frame 248 on its supports 249 to the position Fig. 2. the catch 261ᶻ engaging the member 262. The bumpers 336 rigid from the frame 173 striking the braces 304 and 305 to retard the latching action of 261ᶻ upon the member 262. The return of the rod 260 caused by the return pivoting of the members 249 causes the lever and rod assembly 328, 329, 330 to pull on the member 331 to drop the abutting board against the runners 334 as in Fig. 2. The operator releases lever 166 and hand catch 168. The elevator is again started and the bundles received from the fork 101 are again traveling toward the shock-former. At 337 is a latch for engaging to the hand grip 242 so as to permit the centering springs 232—233 to control the position of the frame 248 by their spring action alone.

Such modifications may be employed as lie within the scope of the appended claims. Having fully described our invention, what we now claim as new and desire to secure by Letters Patent is;

1. In a shocking machine, elements for collecting grain bundles at the side of a grain binder with the butts of the bundles arranged towards the front of the binder; thence, lifting, tossing and conveying the bundles in a reversed position and in a rearward direction; the alignment of the butts of the bundles against a flat plate as a straight edged abutting plate element, the support of the allied bundles upon a shock-former element forwardly positioned from and below the abutting board element, side members of the shock former having a pivotal connection with a ground spike element; means for compressing the side members at their pivotal ground spike connection; pivotal supports for the upper edge of the abutting plate and means for swinging said plate up and outwardly; means then acting for pivotally supporting and swinging the shock former and allied elements downwardly and to drive the spike into the ground; and means for effecting the release of the side elements of the shock-former from the settled shock and for returning the shock former elements to the initial position and for lowering the abutting board in and behind the shock former.

2. In a grain shocker, a hopper comprising a V-shaped trough unit and a belt conveyor at one end thereof beneath an opening in the base of the hopper.

3. In a grain shocker, a hopper having a vertical face and a sloping bed constituting a V-shaped trough assembly, spaced slots in the vertical face; an arm member pivotally mounted adjacent the vertical face, said arm having stationary fork units spaced away from the said face of the hopper and having pivotable fork units arrangeable with the slots of said hopper.

4. In a grain shocker, a hopper having a vertical face and a sloping bed constituting a V-shaped trough assembly, spaced slots in the vertical face; an arm member pivotally mounted adjacent the vertical face, said arm having stationary fork units spaced away from the face of the hopper and having pivotable forks arrangeable within the slotted face of the hopper; and power means for occasioning lifted movements to said fork arm element and mechanical means for limiting said travel and occasioning pivoted reverse movements of said arm element.

5. A frame element as an attachment for binders; a drive shaft rotatably mounted thereon with a gear meshing with a gear of the binder; a second shaft, sprockets and chain means for transmitting power from the drive shaft to the second shaft; a trailer pivotally mounted from elements in the axis of the bull wheel, a roller support at the rear therefor; a hopper carried by the main frame, a pivotable arm cooperable therewith, power means for driving the arm and stop and spring means for reversing the pivoted movement of the arm; an elevator and conveying mechanisms and power driving means therefor; a pair of supports on the trailer, a frame rockable in said supports; a frame pivoted at the rear of the rocker frame, shock-forming elements carried by the pivoted frame including a pair of side elements and a ground spike as a pivotal connection for the side elements; means for pivoting the shock forming elements in rear of the hopper and conveyor; an abutting board as a flat straight edged plate pivotally suspended from above the shock forming elements; means for pivotally raising or lowering the shock former frame associated elements to co-ordinate with a pivotal lowering and raising of the abutting board elements; and means for contracting the side arm elements of the shock former upon the ground spike element prior to the pivotal descent of the ground spike into the ground and for the then release of the contracted side arm elements for the purposes of the invention.

6. In a shocking machine, a main frame, a trailer frame pivoted at the rear thereof from frame elements axially aligned with a shaft on the main frame; an upright frame element at the rear of the trailer; a conveyor mechanism adjustably hung from said frame and carried from the forward part of the trailer; a pivoted frame element at the rear of a rocking frame element adjustably rockable upon mountings carried by the trailer; paired expansible and contractible side arm elements as a shock forming means supported by the pivoted frame element, a ground spike as the pivotal connection of said arm elements; means for holding the pivoted frame upright behind the conveyor mechanism; an abutting board comprising a straight edged plate pivotally depending from above and behind the pivoted frame and means for pivoting said board from or towards the shocking mechanism as desired; means for contracting the shock forming mechanism, a catch and latch element allied therewith and for permitting certain movements and a lowering pivoted movement rearwardly of the shock forming mechanism after compression of the arm elements and means for later expanding the arm elements upon the ground spike when grounded and for pivotally raising the frame element and the expanded shock former elements forwardly of a then lowered abutting board relationship.

7. In a shocking machine having a frame work and trailer elements; a hopper for grain bundles, a conveyor rearwardly arranged therefrom, fork means for transmitting bundles from the hopper to the conveyor; means for occasioning travel of bundles on the conveyor in a rearward direction and reversed from their original position; an abutting board as a straight edge plate hinged along its upper edge and depending from frame supports; a shock former comprising paired contractible and expansible arm elements pivotally connected by a ground spike, a frame pivotally supporting the shock former in an expanded position forward of a lowered position of the abutting board; means for first swinging the abutting board upwardly and away from the shock-former after contraction thereof and for thence swinging the compacted shock former through a vertical arc to a ground contact of associated elements and a ground penetration of the ground spike, and means for expanding the arm elements, for lifting the ground spike and associated elements forward of the abutting board in a then pivoted and lowered position of said board.

8. In a shock former; a pair of sheet iron forming members, a pair of side members supporting the forming members, a ground spike as a pivotal connection for the side members.

9. In a shock former; a pair of U-shaped arc members connected at a pivoted ground spike element carrying a clevis; means for holding the arms in an expanded pivoted position; an outer main frame element; braces hinged between the main frame and the arc members; a brace for centrally positioning the arc members within the main frame; means for breaking the expanded pivoted position of the arm elements and for occasioning clamping action thereof.

10. In a shock-former, a pivoted frame mechanism including a supported frame element from which said frame mechanism pivots; expansible and contractible former arm elements, rope elements connecting parts thereof in an intersecting relationship; a lever, clutch, cable and drum assembly; latch means for maintaining expanded position of the former elements connecting to the cable; a forked lever and a catch therefor; contractible movements of the former acting to strike the forked lever to break the catch connection for the purposes specified.

11. A shocking machine including a frame support, a shocker frame member pivoted thereon for upward and downward arc movements; a ground spike, expansible and contractible side arm elements pivotable upon the ground spike and also pivotally braced and aligned within the frame member; means for maintaining expansion of the arm elements, means for maintaining an upright position of such expanded arm elements and its carry frame assembly; means for breaking such expansion, means for contracting the arm elements, means for then breaking the upright position of the frame assembly and permitting the contracted assembly to pivot rearwardly.

12. In a shock-former, a frame member; a pair of arced members pivotally connected by a ground spike; each member having an inner sheathing as a forming element; a clevis connecting at the ground spike; a latch and a catch, a cable passing the clevis for controlling catch and latch action for the purposes specified.

13. In a shock former; a U-shaped frame member, a pair of arm members rigid to the base thereof, a point of pivot for said arm members; a pocket at the base of the frame member; means connecting to the base element of the assembly for permitting and controlling pivoted movements of the frame elements; a pair of side members located within the U-shaped part of the frame member, each covered with a sheet iron former; a ground spike as a pivot for the side members, a clevis attached thereto, a spring controlled catch and latch assembly, a cable leading to the latch; brace means centering and positioning the side arm elements; said side arms being expansible and contractible and the clevis and base features susceptible of anchorage within the pocket under desired conditions.

14. In a shock former, a U-shaped frame member carrying inner side arms as a contractible and expansible shock-forming mechanism, a ground spike serving as a pivot for said side arms, and a pair of runners for said frame.

15. In a shock forming machine, a pair of sheet iron forming members having spiked rib members thereon; a pair of side members supporting the forming members, a ground spike as a pivotal connection of the side members.

16. In a shocking machine, a trailer, a frame pivoted to the trailer; shock forming elements carried by the pivoted frame including a pair of side elements and a ground spike as a pivotal connection therefor; means for occasioning vertical arc movements of the pivoted frame; an abutting board comprising a flat plate as a straight edge element pivotally depending from above the shock forming elements; means for pivotally lowering and raising the abutting board to cooperate with the pivotally raised and lowered shock forming elements; and means for contracting the side arm elements of the shock former upon the ground spike element prior to the pivotal descent of the pivoted frame and the pivotal ascent of the abutting board, and means for expanding the contracted side elements of the shock former after ground penetration of the ground spike and for the raising of the pivotable frame and the lowering of the abutting board into their prior relationship.

In testimony whereof we hereunto affix our signatures.

ISAAC L. DAWSON.
CLARENCE N. DAWSON.
RAYMOND W. DAWSON.